(12) United States Patent
Codevilla et al.

(10) Patent No.: US 11,378,965 B2
(45) Date of Patent: Jul. 5, 2022

(54) SYSTEMS AND METHODS FOR CONTROLLING A VEHICLE BASED ON DETERMINED COMPLEXITY OF CONTEXTUAL ENVIRONMENT

(71) Applicant: Toyota Research Institute, Inc., Los Altos, CA (US)

(72) Inventors: Felipe Codevilla, Los Altos, CA (US); Eder Santana, Los Altos, CA (US); Adrien D. Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/192,627

(22) Filed: Nov. 15, 2018

(65) Prior Publication Data

US 2020/0159231 A1 May 21, 2020

(51) Int. Cl.
*G05D 1/02* (2020.01)
*B60W 50/00* (2006.01)
*G05D 1/00* (2006.01)

(52) U.S. Cl.
CPC ....... *G05D 1/0221* (2013.01); *B60W 50/0097* (2013.01); *G05D 1/0088* (2013.01);
(Continued)

(58) Field of Classification Search
CPC ................................................... G05D 1/0221
(Continued)

(56) References Cited

U.S. PATENT DOCUMENTS 666,666 A    1/1901   Hackett
1,234,567 A  7/1917   Quigley
(Continued)

FOREIGN PATENT DOCUMENTS

EP    1962429      8/2008
WO    2009026603   3/2009
(Continued)

OTHER PUBLICATIONS

Dickmanns, E.D., 2007. Dynamic vision for perception and control of motion. Springer Science & Business Media.
(Continued)

*Primary Examiner* — Jean Paul Cass
(74) *Attorney, Agent, or Firm* — Sheppard, Mullin, Richter & Hampton LLP; Hector A. Agdeppa; Daniel N. Yannuzzi

(57) ABSTRACT

Exemplary implementations may: generate output signals conveying contextual information and vehicle information; determine, based on the output signals, the contextual information; determine, based on the output signals, the vehicle information, determine, in an ongoing manner, based on the contextual information and/or the vehicle information, values of a complexity metric, the complexity metric quantifying predicted complexity of a current contextual environment and/or predicted complexity of a likely needed response to a change in the contextual information; filter, based on the values of the complexity metric, the contextual information spatially; and control, based on the vehicle information and the spatially filtered contextual information, the vehicle such that the likely needed response is satisfied.

20 Claims, 5 Drawing Sheets

(52) U.S. Cl.
CPC ... *G05D 1/0276* (2013.01); *B60W 2510/0638* (2013.01); *B60W 2520/10* (2013.01); *B60W 2520/105* (2013.01); *B60W 2530/13* (2021.08); *B60W 2540/10* (2013.01); *B60W 2540/12* (2013.01); *B60W 2540/16* (2013.01); *B60W 2540/18* (2013.01); *B60W 2552/00* (2020.02); *B60W 2554/00* (2020.02); *B60W 2555/20* (2020.02); *B60W 2555/60* (2020.02)

(58) Field of Classification Search
USPC .......................................................... 701/27
See application file for complete search history.

(56) References Cited

U.S. PATENT DOCUMENTS

| | | | |
|---|---|---|---|
| 1,962,429 A | 6/1934 | Conover | |
| 2,007,174 A | 7/1935 | Benjamin | |
| 2,010,123 A | 8/1935 | Woodruff | |
| 2,011,156 A | 8/1935 | Becker | |
| 2,013,101 A | 9/1935 | Inglee | |
| 2,013,184 A | 9/1935 | Marden | |
| 6,543,321 B1 | 4/2003 | Heider | |
| 7,519,564 B2* | 4/2009 | Horvitz | G06N 20/00 706/14 |
| 8,019,491 B1* | 9/2011 | McCusker | G08G 5/0021 340/963 |
| 8,234,068 B1* | 7/2012 | Young | G08G 5/0069 701/410 |
| 8,644,600 B2* | 2/2014 | Yang | G06T 7/162 345/592 |
| 9,403,273 B2 | 8/2016 | Payton | |
| 9,669,827 B1* | 6/2017 | Ferguson | G05D 1/0088 |
| 9,816,827 B1* | 11/2017 | Slusar | G01C 21/34 |
| 9,849,852 B1* | 12/2017 | Larner | B60R 21/0134 |
| 9,868,391 B1* | 1/2018 | Fairfield | B60W 30/0956 |
| 9,927,813 B1* | 3/2018 | Ferguson | G01S 7/497 |
| 9,958,379 B1* | 5/2018 | Zhu | G01N 21/27 |
| 10,059,334 B1* | 8/2018 | Zhu | G08G 1/09623 |
| 10,089,556 B1 | 10/2018 | Xu | |
| 10,134,278 B1* | 11/2018 | Konrardy | G08G 1/165 |
| 10,144,420 B2* | 12/2018 | Yoo | B62D 15/02 |
| 10,146,223 B1* | 12/2018 | Luders | G05D 1/0088 |
| 10,156,848 B1* | 12/2018 | Konrardy | G06Q 30/0284 |
| 10,222,228 B1* | 3/2019 | Chan | B60W 40/09 |
| 10,223,479 B1* | 3/2019 | Konrardy | G08G 1/096775 |
| 10,233,673 B1* | 3/2019 | Chan | E05B 77/54 |
| 10,246,097 B1* | 4/2019 | Fields | G06F 8/65 |
| 10,247,565 B2* | 4/2019 | Nepomuceno | G01C 21/3492 |
| 10,297,152 B1* | 5/2019 | Patel | G08G 1/096766 |
| 10,303,178 B1* | 5/2019 | Gutmann | B60W 30/08 |
| 10,324,463 B1* | 6/2019 | Konrardy | G05D 1/0278 |
| 10,373,259 B1* | 8/2019 | Konrardy | G06Q 40/00 |
| 10,386,845 B1* | 8/2019 | Konrardy | G05D 1/0088 |
| 10,393,852 B2* | 8/2019 | Xu | G08G 1/20 |
| 10,395,332 B1* | 8/2019 | Konrardy | G05D 1/0246 |
| 10,421,453 B1* | 9/2019 | Ferguson | B60W 30/0953 |
| 10,444,754 B2* | 10/2019 | Fairfield | G05D 1/0038 |
| 2006/0269135 A1* | 11/2006 | Ramsay | G06V 10/56 382/181 |
| 2006/0269140 A1* | 11/2006 | Ramsay | G06V 10/56 382/191 |
| 2006/0269161 A1* | 11/2006 | Ramsay | G06T 7/174 382/276 |
| 2007/0087756 A1* | 4/2007 | Hoffberg | G06Q 20/065 455/450 |
| 2008/0159605 A1* | 7/2008 | Ramsay | G06K 9/00 382/128 |
| 2009/0010521 A1* | 1/2009 | Ramsay | G06V 10/255 382/141 |
| 2009/0175526 A1* | 7/2009 | Ramsay | G06K 9/6224 382/190 |
| 2010/0183225 A1* | 7/2010 | Vantaram | G06T 7/11 382/173 |
| 2011/0244919 A1* | 10/2011 | Aller | G06Q 30/06 382/165 |
| 2013/0304476 A1* | 11/2013 | Kim | G10L 21/00 704/270 |
| 2016/0203435 A1* | 7/2016 | Waltniel | G06Q 10/063118 705/7.17 |
| 2017/0259753 A1* | 9/2017 | Meyhofer | H04N 13/204 |
| 2018/0032078 A1* | 2/2018 | Ferguson | G06V 20/58 |
| 2019/0241122 A1* | 8/2019 | Cohen | G05D 1/0238 |

FOREIGN PATENT DOCUMENTS

| | | |
|---|---|---|
| WO | 2011156757 | 12/2011 |
| WO | 2013101550 | 7/2013 |
| WO | 2013184698 | 12/2013 |

OTHER PUBLICATIONS

Leonard, J., How, J., Teller, S., Berger, M., Campbell, S., Fiore, G., Fletcher, L., Frazzoli, E., Huang, A., Karaman, S. and Koch, O., 2008. A perception-driven autonomous urban vehicle. Journal of Field Robotics, 25(10), pp. 727-774.

K.A. Wyrobek, E.H. Berger, HF M. Van der Loos, and K. Salisbury. Towards a personal robotics development platform: Rationale and design of an intrinsically safe personal robot. In International Conference on Robotics and Automation (ICRA), 2008.

J. Kober, E. Oztop, and J. Peters. Reinforcement learning to adjust robot movements to new situations. In Robotics: Science and Systems (RSS), 2010.

Shalev-Shwartz, S., Shammah, S. and Shashua, A., 2016. Safe, multi-agent, reinforcement learning for autonomous driving. arXiv preprint arXiv:1610.03295.

Chen, C., Seff, A., Kornhauser, A. and Xiao, J., 2015. Deepdriving: Learning affordance for direct perception in autonomous driving. In Proceedings of the IEEE International Conference on Computer Vision; pp. 1-9.

Sauer, A., Savinov, N. and Geiger, A., 2018. Conditional Affordance Learning for Driving in Urban Environments. arXiv preprint arXiv:1806.06498.

Müller, M., Dosovitskiy, A., Ghanem, B., & Koltun, V. (2018). Driving Policy Transfer via Modularity and Abstraction. arXiv preprint arXiv:1804.09364.

Pomerleau, D.A., 1989. Alvinn: An autonomous land vehicle in a neural network. In Advances in neural information processing systems (pp. 305-313).

Bojarski, M., Del Testa, D., Dworakowski, D., Firner, B., Flepp, B., Goyal, P., Jackel, L.D., Monfort, M., Muller, U., Zhang, J. and Zhang, X., 2016. End to end learning for self-driving cars. arXiv preprint arXiv:1604.07316.

Levine, S., Finn, C., Darrell, T. and Abbeel, P., 2016. End-to-end training of deep visuomotor policies. The Journal of Machine Learning Research, 17 (1); pp. 1-40.

Xu, H., Gao, Y., Yu, F. and Darrell, T., 2017. End-to-end learning of driving models from large-scale video datasets. arXiv preprint. Zhu2018] Zhu, Y., Wang, Z., Merel, J., Rusu, A., Erez, T., Cabi, S., Tunyasuvunakool, S., Kramár, J., Hadsell, R., de Freitas, N. and Heess, N., 2018. Reinforcement and imitation learning for diverse visuomotor skills. arXiv preprint arXiv:1802.09564.

Schaal, S., 1999. Is imitation learning the route to humanoid robots?. Trends in cognitive sciences, 3 (6), pp. 233-242.

Codevilla, F., Müller, M., Dosovitskiy, A., López, A. and Koltun, V., 2017. End-to-end driving via conditional imitation learning. arXiv preprint arXiv:1710.02410.

Liang, X., Wang, T., Yang, L. and Xing, E., 2018. CIRL: Controllable Imitative Reinforcement Learning for Vision-based Self-driving. arXiv preprint arXiv:1807.03776.

Kuffner, James (2010). "Cloud-Enabled Robots". IEEE-RAS International Conference on Humanoid Robotics.

LeCun, Y., Bengio, Y. and Hinton, G., 2015. Deep learning. Nature, 521(7553), p. 436.

(56) References Cited

OTHER PUBLICATIONS

Zhang, C., Bengio, S., Hardt, M., Recht, B. and Vinyals, O., 2016. Understanding deep learning requires rethinking generalization. arXiv preprint arXiv:1611.03530.
Sünderhauf, N., Brock, O., Scheirer, W., Hadsell, R., Fox, D., Leitner, J., Upcroft, B., Abbeel, P., Burgard, W., Milford, M. and Corke, P., 2018. The limits and potentials of deep learning for robotics. The International Journal of Robotics Research, 37 (4-5); pp. 1-15.
Bojarski, M., Yeres, P., Choromanska, A., Choromanski, K., Firner, B., Jackel, L. and Muller, U., 2017. Explaining how a deep neural network trained with end-to-end learning steers a car. arXiv preprint arXiv:1704.07911.
Wang, Z., Schaul, T., Hessel, M., Van Hasselt, H., Lanctot, M. and De Freitas, N., 2015. Dueling network architectures for deep reinforcement learning. arXiv preprint arXiv:1511.06581.
Das, A., Agrawal, H., Zitnick, L., Parikh, D. and Batra, D., 2017. Human attention in visual question answering: Do humans and deep networks look at the same regions?. Computer Vision and Image Understanding, 163 ; pp. 41-45.
Kim, J. and Canny, J.F., Oct. 2017. Interpretable Learning for Self-Driving Cars by Visualizing Causal Attention. In ICCV (pp. 2961-2969).
Itti, L., Koch, C. and Niebur, E., 1998. A model of saliency-based visual attention for rapid scene analysis. IEEE Transactions on pattern analysis and machine intelligence, 20 (11), pp. 1254-1259.
Ba, J., Mnih, V. and Kavukcuoglu, K., 2014. Multiple object recognition with visual attention. arXiv preprint arXiv:1412.7755.
Zagoruyko, S. and Komodakis, N., 2016. Paying more attention to attention: Improving the performance of convolutional neural networks via attention transfer. arXiv preprint arXiv:1612.03928.
Vaswani, A., Shazeer, N., Parmar, N., Uszkoreit, J., Jones, L., Gomez, A.N., Kaiser, Ł. and Polosukhin, I., 2017. Attention is all you need. In Advances in Neural Information Processing Systems; pp. 1-11.
Pearl, J., 2009. Causality . Cambridge university press.
Achille, A. and Soatto, S., 2018. A Separation Principle for Control in the Age of Deep Learning. Annual Review of Control, Robotics, and Autonomous Systems, 1, pp. 287-307.
Underwood, G., 2007. Visual attention and the transition from novice to advanced driver. Ergonomics , 50 (8), pp. 1235-1249.
Lee, Y.C., Lee, J.D. and Ng Boyle, L., 2007. Visual attention in driving: The effects of cognitive load and visual disruption. Human Factors , 49 (4), pp. 721-733.
Alletto, S., Palazzi, A., Solera, F., Calderara, S. and Cucchiara, R., 2016. Dr (eye) ve: a dataset for attention-based tasks with applications to autonomous and assisted driving. In Proceedings of the IEEE Conference on Computer Vision and Pattern Recognition Workshops; pp. 1-7.
Xia, Y., Zhang, Jinkyu Kim, Ken Nakayama, Karl Zipser, and David Whitney, Dec. 6, 2018. Predicting Driver Attention in Critical Situations. arXiv:1711.06406v3 (pp. 1-15).
Chen, S., Zhang, S., Shang, J., Chen, B. and Zheng, N., 2017. Brain-inspired Cognitive Model with Attention for Self-Driving Cars. IEEE Transactions on Cognitive and Developmental Systems.
Niculae, V. and Blondel, M., 2017. A regularized framework for sparse and structured neural attention. In Advances in Neural Information Processing Systems; pp. 1-11.
Mackenzie, A.K. and Harris, J.M., 2014, March. Characterizing visual attention during driving and non-driving hazard perception tasks in a simulated environment. In Proceedings of the Symposium on Eye Tracking Research and Applications (pp. 127-130). ACM.
Codevilla, F., López, A.M., Koltun, V. and Dosovitskiy, A., 2018. On Offline Evaluation of Vision-based Driving Models. arXiv preprint arXiv:1809.04843.
Dosovitskiy, A., Ros, G., Codevilla, F., Lopez, A. and Koltun, V., 2017. CARLA: An open urban driving simulator. arXiv preprint arXiv:1711.03938.
Zou, H. and Hastie, T., 2005. Regularization and variable selection via the elastic net. Journal of the Royal Statistical Society: Series B (Statistical Methodology) , 67 (2), pp. 301-320.

\* cited by examiner

SYSTEMS AND METHODS FOR CONTROLLING A VEHICLE BASED ON DETERMINED COMPLEXITY OF CONTEXTUAL ENVIRONMENT

TECHNICAL FIELD

The present disclosure relates to systems and methods for controlling a vehicle based on spatially filtering contextual information by a determined value of complexity of a contextual environment.

BACKGROUND

Autonomous vehicles may learn and operate through many different techniques. Techniques may include a module approach, end-to-end learning, imitation learning, and/or others. However, these techniques may be costly due to large amounts of necessary demonstration training. Furthermore, even with a large enough set of demonstrations, every possible driving scenario may still not be included.

BRIEF SUMMARY OF THE DISCLOSURE

The present disclosure proposes a vehicle that reacts to visual stimuli by forcing focus on the surrounding contextual environment upon determining values of complexity of the contextual environment of the vehicle. The determined values of complexity may force more focus on a part of or all of the contextual environment, or may force general focus on the contextual environment. Controlling the vehicle may be based on the level of focus on the contextual environment and vehicle operations of the vehicle. The present disclosure is self-supervised such that data is not provided to the vehicle with description as input, but input is derived from sensor generated output signals from the vehicle.

One aspect of the present disclosure relates to a vehicle. The vehicle may include one or more hardware processors configured by machine-readable instructions and one or more sensors. The sensors may be configured to generate output signals conveying contextual information and vehicle information. The contextual information may characterize a contextual environment surrounding a vehicle. The vehicle information may characterize vehicle operations of the vehicle. The processor(s) may be configured to determine the contextual information. The contextual information may be based on the output signals. The processor(s) may be configured to determine the vehicle information. The vehicle information may be based on the output signals. The processor(s) may be configured to determine, in an ongoing manner, values of a complexity metric. The values of a complexity metric may be based on the contextual information and/or the vehicle information. The complexity metric may quantify predicted complexity of a current contextual environment and/or predicted complexity of a likely needed response to a change in the contextual information. The processor(s) may be configured to filter the contextual information spatially. The spatial filtering of the contextual information may be based on the values of the complexity metric. The level to which information may be filtered spatially may be based on the values of the complexity metric. The processor(s) may be configured to filter the contextual information spatially such that specific contextual information of the contextual information is determined. The processor(s) may be configured to filter the contextual information spatially such that filtering includes forcing spatial focus on the specific contextual information. The processor(s) may be configured such that filtering the contextual information spatially includes generally focusing on the contextual information. The processor(s) may be configured to control the vehicle such that the likely needed response is satisfied. Controlling the vehicle may be based on the vehicle information and the spatially filtered contextual information.

As used herein, the term "determine" (and derivatives thereof) may include measure, calculate, compute, estimate, approximate, generate, and/or otherwise derive, and/or any combination thereof.

Another aspect of the present disclosure relates to a method. The method may include generating output signals conveying contextual information and vehicle information. The contextual information may characterize a contextual environment surrounding a vehicle. The vehicle information may characterize vehicle operations of the vehicle. The method may include determining the contextual information. The contextual information may be based on the output signals. The method may include determining the vehicle information. The vehicle information may be based on the output signals. The method may include determining, in an ongoing manner, values of a complexity metric. The values of a complexity metric may be based on the contextual information and/or the vehicle information. The complexity metric may quantify predicted complexity of a current contextual environment and/or predicted complexity of a likely needed response to a change in the contextual information. The method may include filtering the contextual information spatially. The spatial filtering of the contextual information may be based on the values of the complexity metric. The level to which information may be filtered spatially may be based on the values of the complexity metric. The method may include filtering the contextual information spatially such that specific contextual information of the contextual information is determined. The method may include filtering the contextual information spatially such that filtering includes forcing spatial focus on the specific contextual information. The method may include filtering such that filtering the contextual information spatially includes generally focusing on the contextual information. The method may include controlling the vehicle such that the likely needed response is satisfied. Controlling the vehicle may be based on the vehicle information and the spatially filtered contextual information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
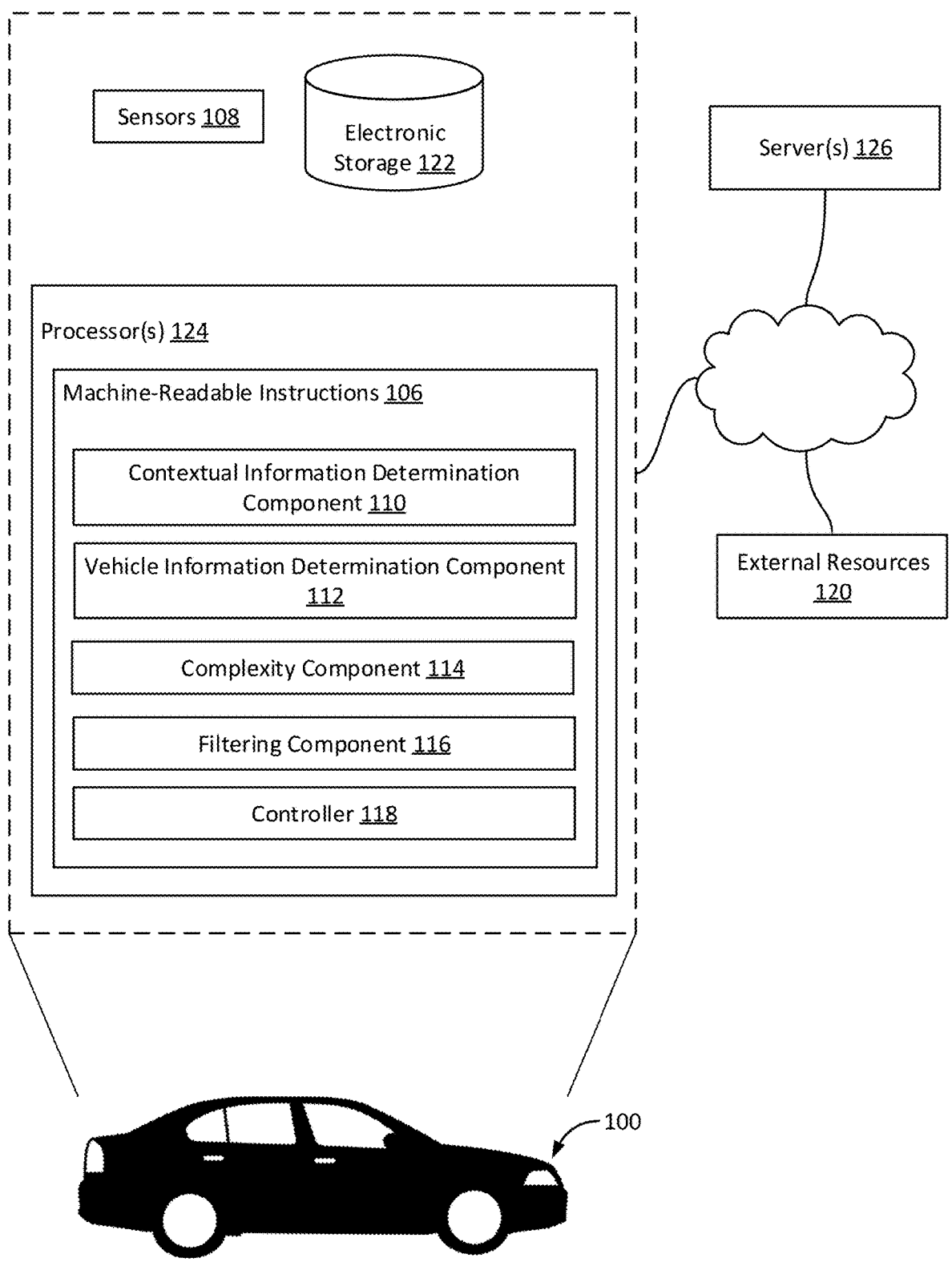
FIG. 1 illustrates a vehicle configured to operate based on spatially filtering contextual information, in accordance with one or more implementations.

FIG. 1 illustrates vehicle(s) 100, in accordance with one or more implementations. Vehicle(s) 100 may be configured to communicate with one or more server(s) 126 according to a client/server architecture and/or other architectures such that some or all instruction components may be performed by server(s) 126.

Vehicle(s) 100 may be configured by machine-readable instructions 106. Machine-readable instructions 106 may include one or more instruction components. The instruction components may include computer program components. The instruction components may include one or more of sensors 108, a contextual information determination component 110, a vehicle information determination component 112, a filtering component 116, a complexity component 114, a controller 118, and/or other instruction components.

Sensors 108 may be configured to generate output signals conveying contextual information and vehicle information. The contextual information may characterize a contextual environment surrounding a vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes, time of day, ambient conditions, direction of traffic in adjacent lanes, relevant traffic signs and signals, one or more characteristics of the vehicle (e.g., size, relative position, motion, object class (e.g., car, bike, pedestrian, etc.), etc.), direction of travel of the vehicle, lane position of the vehicle on the roadway, topography of the roadway, obstacles in the roadway, traffic conditions, and/or others. The roadway may include a city road, urban road, highway, onramp, and/or offramp. Lane position of a vehicle on a roadway, by way of non-limiting example, may be that the vehicle is in the far left lane of a four lane highway. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include rain, hail, snow, fog, and/or other naturally occurring conditions. The vehicle information may characterize vehicle operations of the vehicle. The vehicle operations may be defined by parameter values for one or more vehicle parameters. The vehicle parameters may include the vehicle's speed, acceleration, brake engagement, steering wheel position, time derivatives of steering wheel position, throttle, time derivatives of throttle, gear, exhaust, revolutions per minutes, mileage, emissions, and/or other vehicle operations.

Sensors 108 may include, by way of non-limiting example, one or more of an altimeter (e.g., a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle(s) 100. Vehicle(s) 100 may be configured by machine-readable instructions 106.

Sensors 108 may include image sensors, cameras, and/or other sensors. As used herein, the term "sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, generated output signals from sensors 108 may be a part of a dataset of demonstrations. The dataset of demonstrations may include desired output control to train a robotic platform (i.e., a vehicle). The dataset of demonstrations may be evaluated using, for example, the standard Center for Advanced Research on Language Acquisition (CARLA) environment.

Contextual information determination component 110 may be configured to determine the contextual information characterizing the surrounding contextual environment of vehicle(s) 100. Determination of the contextual information may be based on the output signals. Determination of the contextual information may include identifying obstacles, identifying motion of obstacles, estimating distances between the vehicle and other vehicles, identifying lane markings, identifying traffic lane markings, identifying traffic signs and signals, identifying crosswalk indicators, identifying upcoming curvature of the roadway, and/or other determinations. Determination of the contextual information may include identify ambient conditions such as rain, snow, hail, fog, and/or other ambient conditions that may affect control of the vehicle.

Vehicle information determination component 112 may be configured to determine the vehicle information characterizing the vehicle operations of vehicle(s) 100. Determination of the vehicle information may be based on the output signals. Determination of vehicle information may include identifying vehicle operation malfunctions, identifying if vehicle parameter values have normal or abnormal quantities, identifying if vehicle parameter values have near abnormal quantities, identifying extreme excess or extreme deficiency of vehicle parameter values, converting vehicle parameter values to readable values and/or to another metric, and/or other determinations.

Complexity component 114 may be configured to determine, in an ongoing manner, values of a complexity metric. Determination may be based on the contextual information and/or the vehicle information. The complexity metric may quantify predicted complexity of a current contextual environment. Complexity of a contextual information of a vehicle may represent the quantity of change such that the contextual information is different than previously determined contextual information (i.e., a driving scenario is different from a preceding driving scenario). By way of non-limiting example, a vehicle may be driving along a main roadway when a traffic signal ahead turns yellow. The values of complexity of the contextual information have changed such that the vehicle may no longer maintain its speed, but must engage the braking system. The current contextual environment may be characterized by the most recent contextual information determined. The complexity metric may quantify predicted complexity of a likely needed response to a change in the contextual information. The predicted complexity of the likely need response may represent a quantity of change in vehicle operations necessary. The predicted complexity of the current contextual environment and/or the predicted complexity of the likely needed response to the change in the contextual information may indicate a need for additional vehicle operations and/or changes in vehicle operations.

By way of non-limiting example, the vehicle information and contextual information may include values to vehicle parameters and contextual parameters of a vehicle including a speed of 25 MPH, on a roadway with three lanes, the roadway has one car ahead, and the ambient conditions include sunset lighting. The contextual information may change such that visibility is low and a response is likely needed. The predicted complexity of the likely needed response may be to simply activate the headlights.

By way of non-limiting example, the vehicle information and contextual information of a vehicle may include a speed of 35 MPH, on a roadway with four lanes, the roadway is empty, and the ambient conditions include daytime lighting. The contextual information may change such that there is a moving obstacle ahead crossing the lanes perpendicular to the path of the vehicle and a response is likely needed. The predicted complexity of the likely needed response may include several changes to the vehicle operations, such as decelerating speed to 25 MPH and merging to the right lane.

By way of non-limiting example, the vehicle information and contextual information may include values to vehicle parameters and contextual parameters of a vehicle including a speed of 20 MPH, on a highway with four lanes, the roadway is full with other vehicles, other vehicles' speed is 20 MPH, and the ambient conditions include daytime lighting. The contextual information may change such that the highway expands to five lanes, the other vehicles' speed is increasing, and the highway is less full. The values of complexity of the contextual information may have changed such that the vehicle is no longer driving in traffic. The predicted complexity of the likely needed response may be simple and include accelerating to reach a speed of 55 MPH.

In some implementations, the complexity component 114 may be based on other information. Other information may include geographic priors of a map a localization system. The other information may indicate values of complexity such that the other information is more complex. The other information may be utilized for forced spatial filtering on, for example, school zones.

Filtering component 116 may be configured to filter the contextual information spatially. The filtration may be based on the values of the complexity metric. The level to which information may be filtered spatially is based on the values of the complexity metric such that spatial filtering is dynamic. By way of non-limiting example, the values of the complexity metric may indicate a large change in the contextual information. Therefore, contextual information may be filtered on a higher level such that some contextual information is ignored and some contextual information is acknowledged.

In some implementation, filtering component 116 may be configured to filter the contextual information spatially such that filtering spatially is based on the values of the complexity metric meeting threshold complexity values. Contextual information may only be filtered spatially upon a threshold complexity value being met. Vehicle(s) 100 may have a plurality of threshold complexity values for the contextual parameters defining the contextual information. By way of non-limiting example, a change in contextual information may include the speed of a preceding vehicle decreasing quickly such that the space between the vehicle and the preceding vehicle is minimized to six feet. The space between the two vehicles may meet or surpass a minimum threshold, wherein the threshold complexity value for space between vehicles is 7 feet. The contextual information is filtered spatially such that other contextual information not included in the minimized space is ignored.

Filtering component 116 may be configured to filter the contextual information spatially such that specific contextual information of the contextual information is determined. The specific contextual information may be considered more important than other contextual information. The specific contextual information may include only some contextual parameters and corresponding values. The specific contextual information may be indicative of the likely needed response to the change in the contextual information.

Filtering component 116 may be configured to filter the contextual information spatially such that filtering includes forcing spatial focus on the specific contextual information. Spatial focus may include additional attention on the specific contextual information (i.e., some contextual parameters and corresponding values) more than other contextual information, wherein the specific contextual information is considered more important. Spatial focus may include monitoring the values of the contextual parameters.

By way of non-limiting example, contextual information may include vehicle parameters and contextual parameters with values of a primary vehicle including presences on a four lane highway, the primary vehicle is in the second lane from the left, a second vehicle is ahead in the lane to the right, speed of the vehicle is 50 MPH, and the speed of the second vehicle is 48 MPH. A change in contextual information may include the second vehicle's motion of swerving into the lane of the primary vehicle. The predicted complexity may be determined and the contextual information is filtered spatially such that specific contextual information is determined. The specific contextual information may include the second vehicle, the second vehicle's motion, the second vehicle's speed, and/or other characteristics of the second vehicle. The contextual information may be filtered spatially further such that the specific contextual information is focused on more than other contextual information.

Filtering component 116 may be configured such that filtering the contextual information spatially includes generally focusing on the contextual information. Generally focusing on the contextual information does not include focusing on some contextual information more than other contextual information. Generally focusing on the contextual information includes equal attention to all contextual parameters and values. By way of non-limiting example, contextual information of a vehicle may include contextual parameters and values including presence on a highway, highway is four lanes, overall traffic speed is 20 MPH. A change in the contextual information may include the highway expanding to six lanes and the overall traffic speed improving from a speed of 20 MPH to 65 MPH. Therefore, the values of complexity may change and filtering of contextual information spatially may become more general such that the contextual environment is more invariable.

In some implementations, an elastic net penalty may be utilized to force focus on some contextual information. The elastic net penalty may include a combination of $L\_1$ and $L\_2$ norms, wherein the relative importance of $L\_1$ is proportional to the values of complexity. When values of complexity quantify the predicted complexity of the contextual information such that specific contextual information is important, L1 sparsity regularization forces focus on specific contextual information. Conversely, when values of complexity quantify the predicted complexity of the contextual information such that some contextual information is not more important than other contextual information, L2 minimization forces focus on the contextual information to be more general.

Controller 118 may be configured to control the vehicle such that the likely needed response is satisfied. Controlling the vehicle may be based on the vehicle information and the spatially filtered contextual information. Controlling the vehicle may include determining what changes and/or additions to vehicle operations satisfy the likely needed response. Controlling the vehicle may include implementing the determined changes and/or additions to vehicle operations. By way of non-limiting example, controlling the vehicle may be determining to engage in braking to stop at a line on the roadway when contextual parameter value for a traffic light changes from green to yellow. Upon determination, the brake engagement is implemented and the vehicle is controlled to stop at the line on the roadway.

In some implementations, a deep visuomotor network may be utilized. The deep visuomotor network may take in generated output signals from sensors 108 and other commands (e.g., GPS navigation instructions), and output controls of the vehicle (e.g., the vehicle's speed and steering wheel position) to controller 118, accordingly. In some implementations, Conditional Imitation Learning convolutional architecture may be used as the deep visuomotor network. In some implementations, an end-to-end deep visuomotor network may be used as the deep visuomotor network.

In some implementations, filtering the contextual information based on determined values of complexity may be perform by a neural attention module. The neural attention module may extract an aggregate of activation maps across the layers of the visuomotor network. A plurality of aggregation functions may be utilized. In some implementations, aggregation may include spatial average pooling and average pooling across channels and layers. The pooling may result in a common resolution of all the activation maps.

In some implementations, a differentiable error function may be utilized as an imitation learning objective. The differentiable error function may assess the error of the controls predicted by the deep visuomotor network. The error may be computed with respect to the dataset of demonstrations. In some implementations, a standard squared loss differentiable error function may be utilized. The imitation learning objective may be augmented with a regularization technique described by the components above.

In some implementations, an optimization method may be utilized to find optimal parameters of the deep visuomotor network. The optimization method may jointly minimize the imitation learning objective and the regularization technique described by the components above. In some implementations, the optimization method may include the Adam optimizer.

In some implementations, server(s) 126, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which vehicle(s) 100, and/or external resources 120 may be operatively linked via some other communication media.

External resources 120 may include sources of information outside of vehicle(s) 100, external entities participating with vehicle(s) 100, and/or other resources. In some implementations, some or all of the functionality attributed herein to external resources 120 may be provided by resources included in vehicle(s) 100.

Vehicle(s) 100 may include sensors 108, electronic storage 122, one or more processors 124, and/or other components. Vehicle(s) 100 may include communication lines, or ports to enable the exchange of information with a network and/or other computing platforms. Illustration of vehicle(s) 100 in FIG. 1 is not intended to be limiting. Vehicle(s) 100 may include a plurality of hardware, software, and/or firmware components operating together to provide the functionality attributed herein to vehicle(s) 100. For example, vehicle(s) 100 may be implemented by a cloud of computing platforms operating together as vehicle(s) 100.

Electronic storage 122 may comprise non-transitory storage media that electronically stores information. The electronic storage media of electronic storage 122 may include one or both of system storage that is provided integrally (i.e., substantially non-removable) with vehicle(s) 100 and/or removable storage that is removably connectable to vehicle(s) 100 via, for example, a port (e.g., a USB port, a firewire port, etc.) or a drive (e.g., a disk drive, etc.).

Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from vehicle(s) 100, and/or other information that enables vehicle(s) 100 to function as described herein.

Processor(s) 124 may be configured to provide information processing capabilities in vehicle(s) 100. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 110, 112, 114, 116, and/or 118, and/or other components. Processor(s) 124 may be configured to execute components 110, 112, 114, 116, and/or 118, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, and/or 118, are illustrated in FIG. 1 as being implemented within a single processing unit, in implementations in which processor(s) 124 includes multiple processing units, one or more of components 110, 112, 114, 116, and/or 118, may be implemented remotely from the other components. The description of the functionality provided by the different components 110, 112, 114, 116, and/or 118, described below is for illustrative purposes, and is not intended to be limiting, as any of components 110, 112, 114, 116, and/or 118, may provide more or less functionality than is described. For example, one or more of components 110, 112, 114, 116, and/or 118, may be eliminated, and some or all of its functionality may be provided by other ones of components 110, 112, 114, 116, and/or 118. As another example, processor(s) 124 may be configured to execute one or more additional components that may perform some or all of the functionality attributed below to one of components 110, 112, 114, 116, and/or 118.

Figure 2:
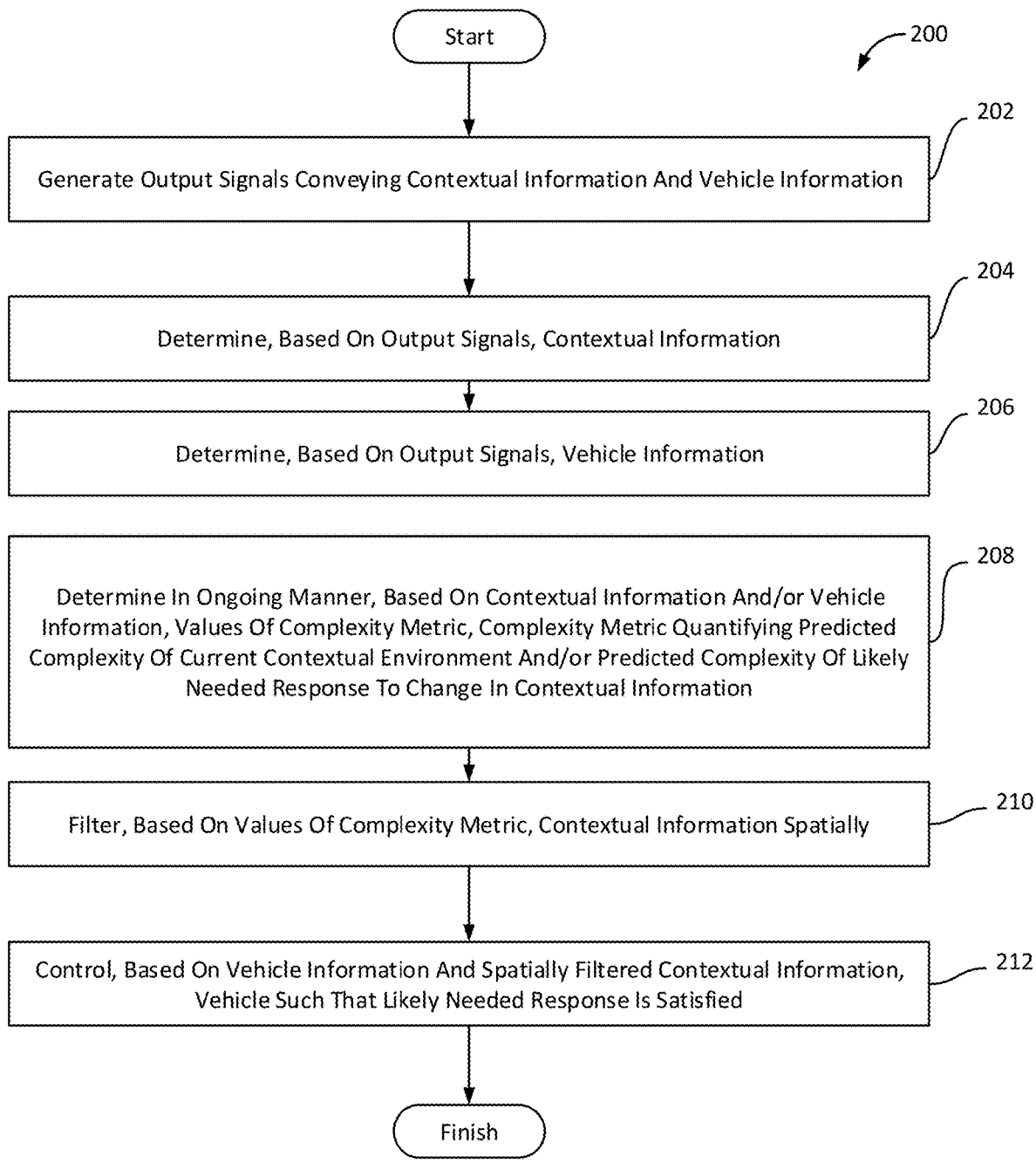
FIG. 2 illustrates a method of controlling a vehicle based on spatially filtering contextual information, in accordance with one or more implementations.

FIG. 2 illustrates a method 200 of controlling a vehicle based on spatially filtering a contextual information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals conveying contextual information and vehicle information. The contextual information may characterize a contextual environment surrounding a vehicle. The vehicle information may characterize vehicle operations of the vehicle. Operation 202 may be performed by one or more hardware processors configured by machine-readable instructions including a component that is the same as or similar to sensors 108, in accordance with one or more implementations.

An operation 204 may include determining the contextual information. The contextual information is based on the output signals. Operation 204 may be performed by one or more hardware processors configured by machine-readable instructions including a component that is the same as or similar to contextual information determination component 110, in accordance with one or more implementations.

An operation 206 may include determining the vehicle information. The vehicle information is based on the output signals. Operation 206 may be performed by one or more hardware processors configured by machine-readable instructions including a component that is the same as or similar to vehicle information determination component 112, in accordance with one or more implementations.

An operation 208 may include determining, in an ongoing manner, values of a complexity metric. The values of the complexity metric may be based on the contextual information and/or the vehicle information. The complexity metric quantifying predicted complexity of a current contextual environment and/or predicted complexity of a likely needed response to a change in the contextual information. Operation 208 may be performed by one or more hardware processors configured by machine-readable instructions including a component that is the same as or similar to complexity component 114, in accordance with one or more implementations.

An operation 210 may include filtering the contextual information spatially. Filtering the contextual information spatially may be based on the values of the complexity metric. The level to which information may be filtered spatially is based on the values of the complexity metric. Operation 210 may be performed by one or more hardware processors configured by machine-readable instructions including a component that is the same as or similar to filtering component 116, in accordance with one or more implementations.

An operation 212 may include controlling the vehicle such that the likely needed response is satisfied. Controlling the vehicle may be based on the vehicle information and the spatially filtered contextual information. Operation 212 may be performed by one or more hardware processors configured by machine-readable instructions including a component that is the same as or similar to controller 118, in accordance with one or more implementations.

Figure 3:
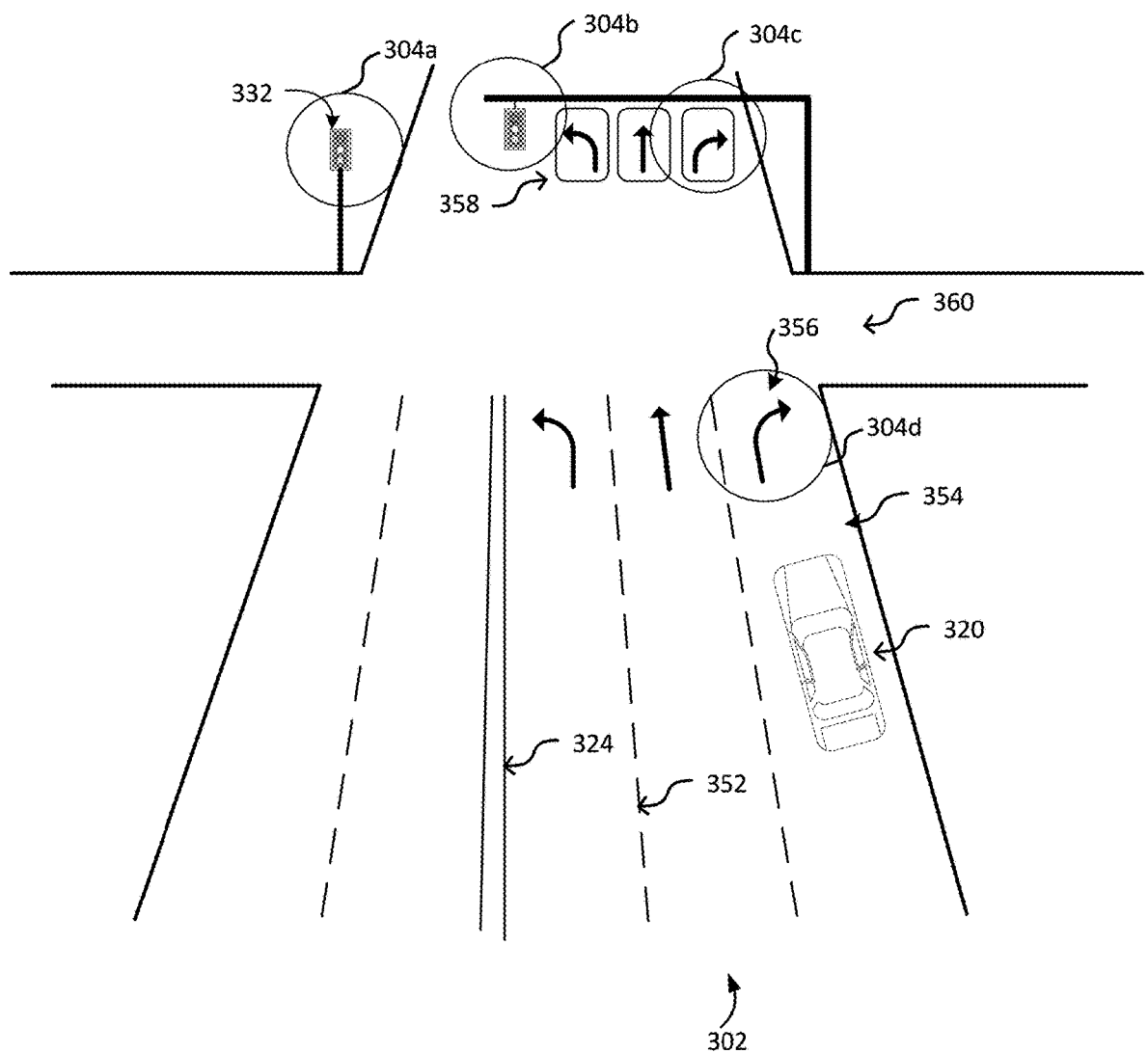
FIG. 3 illustrates spatially filtered contextual information, in accordance with one or more implementations.

FIG. 3 illustrates spatially filtered contextual information, in accordance with one or more implementations. FIG. 3 illustrates intersection 360 of roadway 302, a contextual environment of vehicle 320. The contextual environment is characterized by contextual information, wherein the contextual information may be spatially filtered and some contextual information is more spatially focused. Roadway 302 includes lane markings 352 to distinguish lanes, divider 324 to separate direction of travel, and right lane 354. Intersection 360 includes traffic signals 332, traffic signs 358, and traffic lane marking 356. Vehicle 320 may determine it is approaching intersection 360 and in right lane 354, a right-turn only lane, and operate accordingly from spatial filtration focus 304a, focus 304b, focus 304c, and focus 304d. Focus 304a-b may indicate an intersection and focus 304c-d may indicate right-turn only such that focus 304a-d are more important contextual information than other contextual information. This spatial filtration of contextual information in FIG. 3 is intended to be illustrative. In some implementations, spatially filtering contextual information may be accomplished with one or more additional components not described, without one or more of the components discussed, and/or in a different manner such that there are many way to spatially filter and change the level of focus.

Figure 4:
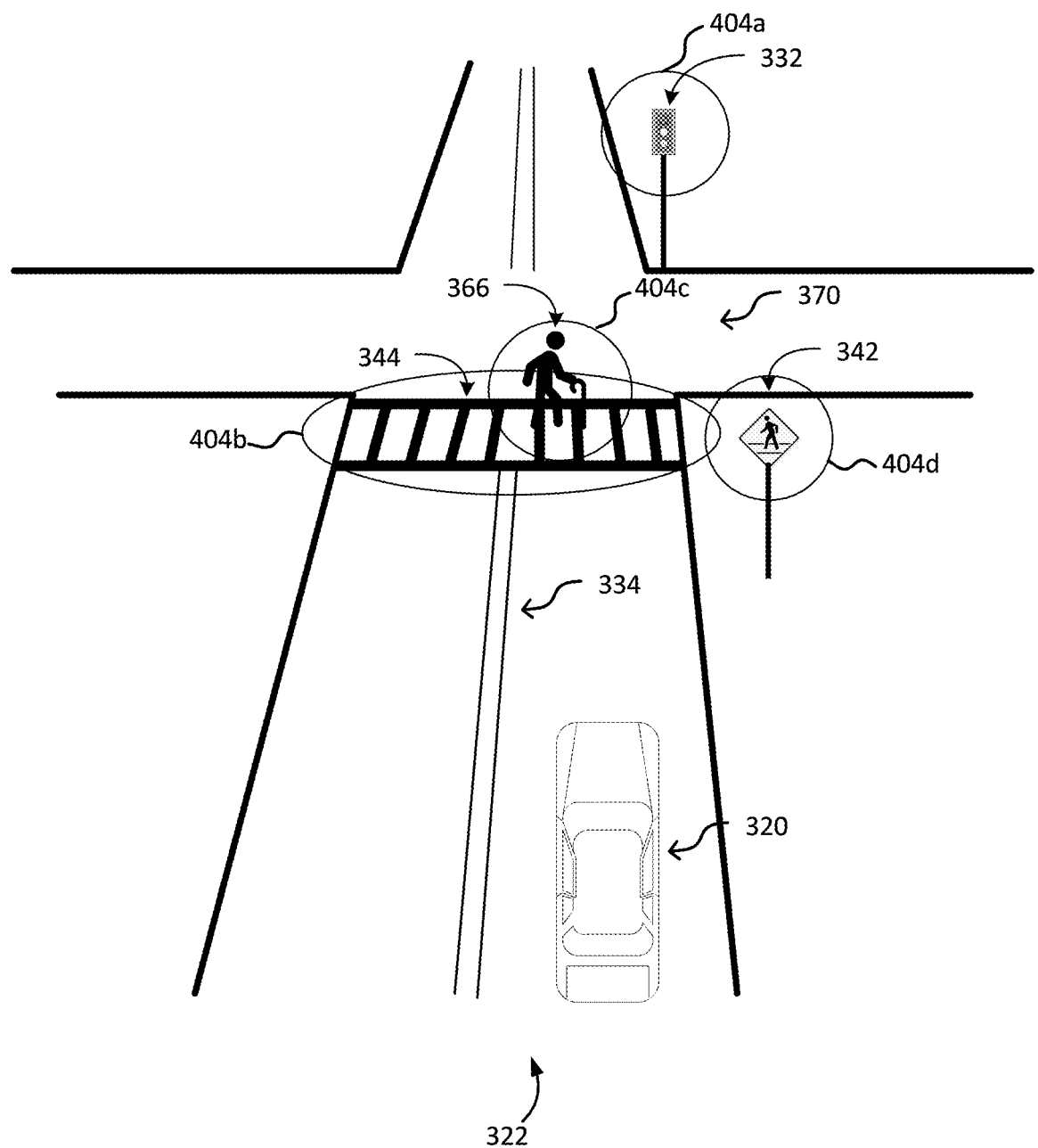
FIG. 4 illustrates spatially filtered contextual information, in accordance with one or more implementations.

FIG. 4 illustrates spatially filtered contextual information, in accordance with one or more implementations. FIG. 4 illustrates intersection 370 of roadway 322, a contextual environment of vehicle 320. The contextual environment is characterized by contextual information, wherein the contextual information may be spatially filtered and some contextual information is more spatially focused. Roadway 322 includes divider 334 to separate direction of travel, crosswalk marking 344, and crosswalk sign 342. Intersection 370 includes traffic signal 332 and pedestrian 366. Vehicle 320 may determine it is approaching intersection 370 and pedestrian 366 from spatial filtration focus 404a, focus 404b, focus 404c, and focus 404d. Focus 404a may indicate an intersection, focus 404b and 404d may indicate an intersection with a crosswalk, and focus 304c indicates an obstacle (i.e., pedestrian 366) such that focus 304a-d are more important contextual information than other contextual information. This spatial filtration of contextual information in FIG. 4 is intended to be illustrative. In some implementations, spatially filtering contextual information may be accomplished with one or more additional components not described, without one or more of the components discussed, and/or in a different manner such that there are many way to spatially filter and change the level of focus.

Figure 5:
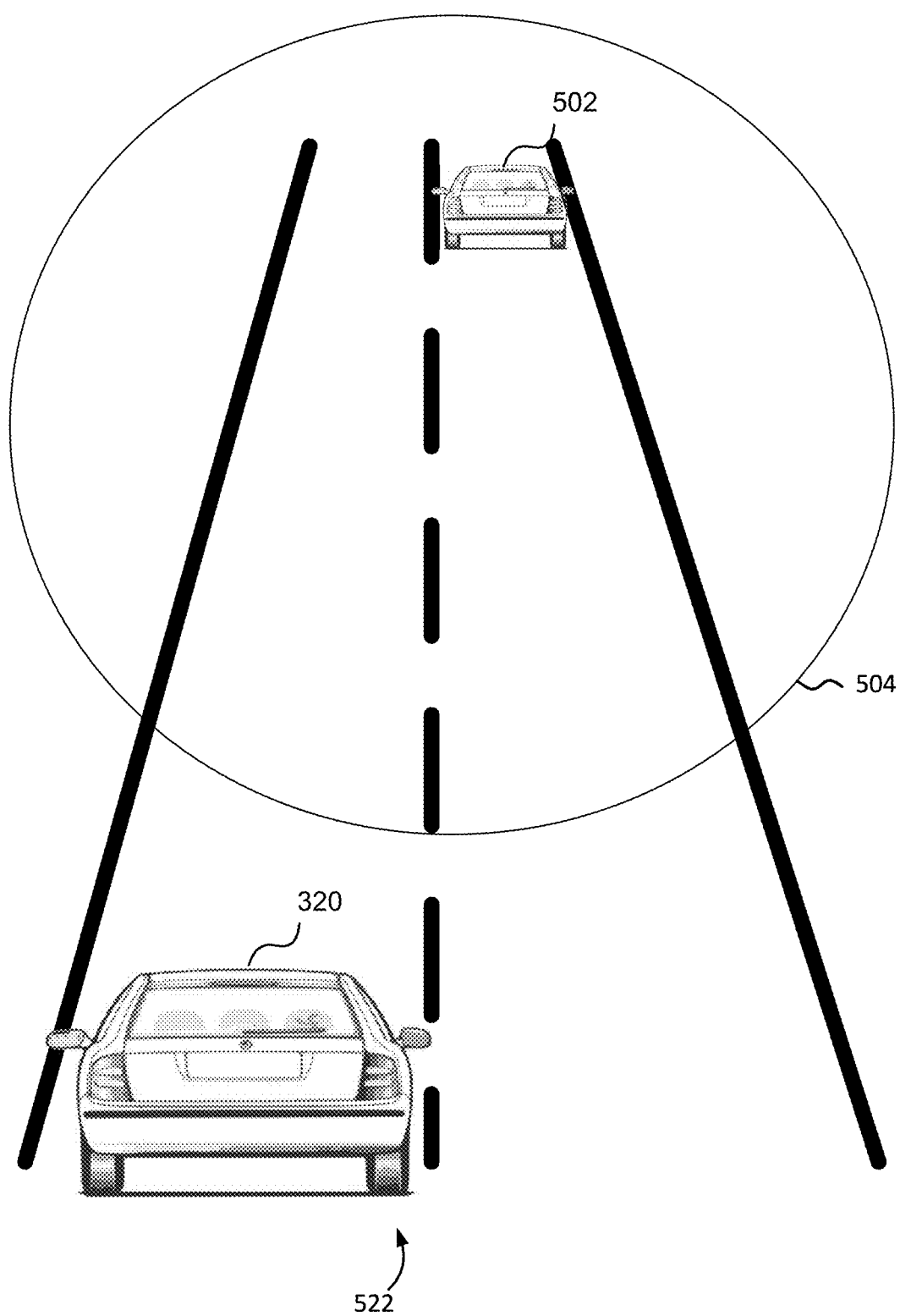
FIG. 5 illustrates spatially filtered contextual information, in accordance with one or more implementations.

FIG. 5 illustrates spatially filtered contextual information, in accordance with one or more implementations. FIG. 5 illustrates roadway 522, a contextual environment of vehicle 320. The contextual environment is characterized by contextual information, wherein the contextual information may be spatially filtered and the contextual information is generally spatially focused. Roadway 522 includes preceding vehicle 502, wherein vehicle 502 is not in close proximity to vehicle 320. Vehicle 320 may determine the contextual information does not have specific contextual information (i.e., vehicle 502) that needs forced focus. Therefore, vehicle 320 generally spatially focuses on the contextual information as illustrated with focus 504. In some implementations, spatially filtering contextual information may be accomplished with one or more additional components not described, without one or more of the components discussed, and/or in a different manner such that there are many way to spatially filter and change the level of focus.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A vehicle, comprising:
one or more processors configured by machine-readable instructions to:
receive contextual information and vehicle information, the contextual information characterizing a contextual environment surrounding the vehicle, the vehicle information characterizing vehicle operations of the vehicle;
determine in an ongoing manner, based on at least one of the contextual information and the vehicle information, values of a complexity metric, the complexity metric quantifying at least one of a predicted complexity of a current contextual environment and a predicted complexity of a likely needed response to a change in the contextual information;
filter, based on the values of the complexity metric, the contextual information spatially, wherein the level to which information is filtered spatially is based on the values of the complexity metric such that an amount of contextual information forming a basis on which to respond to a particular event is spatially reduced or increased commensurate with spatial focusing on the spatially reduced or increased contextual environment; and
control, based on the vehicle information and the spatially filtered contextual information, the vehicle such that the likely needed response is satisfied.

2. The vehicle of claim 1, wherein the one or more processor are further configured by machine-readable instructions such that filtering the contextual information spatially is based on the values of the complexity metric meeting threshold complexity values.

3. The vehicle of claim 1, wherein the one or more processor are further configured by machine-readable instructions such that filtering the contextual information spatially determines specific contextual information of the contextual information.

4. The vehicle of claim 3, wherein the one or more processor are further configured by machine-readable instructions such that filtering the contextual information spatially includes forcing specific spatial focus on the specific contextual information.

5. The vehicle of claim 4, wherein the specific contextual information is indicative of the likely needed response to the change in the contextual information.

6. The vehicle of claim 1, wherein the one or more processors are further configured by machine-readable instructions such that filtering the contextual information spatially includes general spatial focusing on the contextual information.

7. The vehicle of claim 1, wherein the predicted complexity of the current contextual environment and/or the predicted complexity of the likely needed response to the change in the contextual information indicates a need for additional vehicle operations and/or changes in vehicle operations.

8. The vehicle of claim 1, wherein the contextual environment includes direction of travel of the vehicle, number of lanes on a roadway, lane position of the vehicle on the roadway, topography of the roadway, position and motion of other vehicles, obstacles in the roadway, traffic signs and/or signals, traffic conditions, and/or weather conditions.

9. The vehicle of claim 1, wherein the vehicle operations include the vehicle's speed, acceleration, brake engagement, steering wheel position, throttle, gear, exhaust, revolutions per minutes, mileage, and/or emissions.

10. The vehicle of claim 1, wherein determination of the contextual information and/or the vehicle information may include identifying obstacles, ambient conditions that affect control of the vehicle, malfunctions of the vehicle operations, abnormal quantities related to the vehicle operations, and/or converting the vehicle information to another metric.

11. A method, the method comprising:
receiving contextual information and vehicle information, the contextual information characterizing a contextual environment surrounding the vehicle, the vehicle information characterizing vehicle operations of the vehicle;
determining in an ongoing manner, based on at least one of the contextual information and the vehicle information, values of a complexity metric, the complexity metric quantifying at least one of a predicted complexity of a current contextual environment and a predicted complexity of a likely needed response to a change in the contextual information;
filtering, based on the values of the complexity metric, the contextual information spatially, wherein the level to which information is filtered spatially is based on the values of the complexity metric such that an amount of contextual information forming a basis on which to respond to a particular event is spatially reduced or increased commensurate with spatial focusing on the spatially reduced or increased contextual environment; and
controlling, based on the vehicle information and the spatially filtered contextual information, the vehicle such that the likely needed response is satisfied.

12. The method of claim 11, further comprising filtering the contextual information spatially is based on the values of the complexity metric meeting threshold complexity values.

13. The method of claim 11, further comprising filtering the contextual information spatially determines specific contextual information of the contextual information.

14. The method of claim 13, further comprising filtering the contextual information spatially includes forcing specific spatial focus on the specific contextual information.

15. The method of claim 14, wherein the specific contextual information is indicative of the likely needed response to the change in the contextual information.

16. The method of claim 11, further comprising filtering the contextual information spatially includes general spatial focusing on the contextual information.

17. The method of claim 11, wherein the predicted complexity of the current contextual environment and/or the predicted complexity of the likely needed response to the change in the contextual information indicates a need for additional vehicle operations and/or changes in vehicle operations.

18. The method of claim 11, wherein the contextual environment includes direction of travel of the vehicle, number of lanes on a roadway, lane position of the vehicle on the roadway, topography of the roadway, position and motion of other vehicles, obstacles in the roadway, traffic signs and/or signals, traffic conditions, and/or weather conditions.

19. The method of claim 11, wherein the vehicle operations include the vehicle's speed, acceleration, brake engagement, steering wheel position, throttle, gear, exhaust, revolutions per minutes, mileage, and/or emissions.

20. The method of claim 11, wherein determining the contextual information and/or the vehicle information may include identifying obstacles, ambient conditions that affect control of the vehicle, malfunctions of the vehicle operations, abnormal quantities related to the vehicle operations, and/or converting the vehicle information to another metric.

* * * * *